United States Patent
Matsushita et al.

(10) Patent No.: US 9,143,069 B2
(45) Date of Patent: Sep. 22, 2015

(54) DRIVE CONTROL DEVICE

(71) Applicant: OMRON Corporation, Kyoto (JP)

(72) Inventors: Katsumi Matsushita, Hashima (JP);
Hiroyuki Ibuki, Ichinomiya (JP);
Yasuyuki Ohba, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/286,394

(22) Filed: May 23, 2014

(65) Prior Publication Data
US 2014/0361723 A1 Dec. 11, 2014

(30) Foreign Application Priority Data
Jun. 6, 2013 (JP) ................................. 2013-120038

(51) Int. Cl.
*H02P 7/06* (2006.01)
*H02P 7/29* (2006.01)

(52) U.S. Cl.
CPC ................... *H02P 7/2913* (2013.01)

(58) Field of Classification Search
CPC ....................................................... H02P 7/06
USPC ............................................ 318/560, 34, 255
See application file for complete search history.

(56) References Cited

U.S. PATENT DOCUMENTS 5,726,542 A * 3/1998 Ebihara ........................... 318/35

FOREIGN PATENT DOCUMENTS

| JP | 2009-247833 A | 10/2009 |
| JP | 2011-067429 A | 4/2011 |

* cited by examiner

*Primary Examiner* — David S Luo
(74) *Attorney, Agent, or Firm* — Nutter McClennen & Fish LLP; John J. Penny, Jr.

(57) ABSTRACT

A drive control device having: a storage circuit configured to store a reference rotational speed table; a drive signal generation circuit configured to output a drive signal to the direct current motor; and a control circuit. When an absolute value of a difference between a second rotational speed corresponding to a first rotational direction and a third rotational speed corresponding to a second rotational direction is equal to or larger than a predetermined threshold, the control circuit creates separate rotational speed tables for the first rotational direction and the second rotational direction in which each rotational speed table indicates a relation between a rotational speed and an electric power amount per unit time, and determines an amount of electric power that is supplied to the direct current motor which corresponds to a designated rotational speed according to the rotational speed table selected in accordance with a designated rotational rotation.

7 Claims, 9 Drawing Sheets

| Operation | TR1 | TR2 | TR3 | TR4 |
|---|---|---|---|---|
| Forward rotation, Drive | ON | OFF | OFF | ON |
| Forward rotation, Stop | OFF | OFF | OFF | OFF |
| Backward rotation, Drive | OFF | ON | ON | OFF |
| Backward rotation, Stop | OFF | OFF | OFF | OFF |
| Brake | OFF | OFF | ON | ON |

| Duty ratio (%) | Rotational speed reference value, B (rpm) |
|---:|---:|
| 100 | 5000 |
| 90 | 4500 |
| 80 | 4000 |
| 70 | 3500 |
| 60 | 3000 |
| 50 | 2500 |
| 40 | 2000 |
| 30 | 1500 |
| 20 | 1000 |
| 10 | 500 |

| Duty ratio (%) | Rotational speed (rpm) |
|---:|---:|
| 100 | 4000 |
| 90 | 3600 |
| 80 | 3200 |
| 70 | 2800 |
| 60 | 2400 |
| 50 | 2000 |
| 40 | 1600 |
| 30 | 1200 |
| 20 | 800 |
| 10 | 400 |

DRIVE CONTROL DEVICE

CROSS REFERENCE TO RELATED APPLICATIONS

This application claims the benefit of priority from Japanese Patent Application No. 2013-120038, filed Jun. 6, 2013, the entire contents of which is incorporated herein by reference for all purposes.

BACKGROUND

The present invention relates to a drive control device for controlling a direct current motor that drives a movable body provided in a game machine.

A game machine, such as a reel game machine or a pinball game machine, has been devised for executing a performance that appeals to the player's sense of vision, sense of hearing or feeling so as to enhance the player's interest. Especially, in order to execute a performance that appeals to the player's sense of vision, a movable body, such as a movable accessory, may be provided in the game machine. A movement range and a moving speed of the movable body have previously been set in accordance with the performance. Hence, in general, a rotation amount per step has been fixed and the movable body is driven by a stepping motor capable of controlling a rotation amount in units of steps. Then, a processor unit for performance (hereinafter simply referred to as performance CPU) as one example of an upper-level control device transmits, to a control circuit of the stepping motor, a command to rotate the stepping motor just the number of steps corresponding to a movement amount of the movable body that moves to a designated position in accordance with a state of a game. Hence the stepping motor is rotated just that number of steps, resulting in that the movable body moves to the designated position (e.g., Unexamined Japanese Patent Publication No. 2009-247833). Further, in order to accurately control an operation of the movable accessory, the following technique has been proposed: step-out of the motor is detected based on the number of steps given to the motor and a position of the movable accessory detected by a photo sensor, and a CPU sets a deceleration pattern for the motor in accordance with the degree of the step-out and controls the motor in the deceleration pattern (e.g., Unexamined Japanese Patent Publication No. 2011-67429).

In recent years, there has been a tendency of increase in number of movable bodies installed in a game machine so as to enhance the player's interest. With increase in number of movable bodies installed in the game machine, the number of motors that drive the respective movable bodies also increases. However, since a space of the rear surface of the game machine is limited, the more the number of motors increases, the more difficult it is to arrange those motors in the game machine. In particular, the stepping motor needs to perform excitation control on a plurality of phases, and thus has a complicated structure, making a size of the stepping motor large. Further, a price of the stepping motor is relatively high. Therefore, the increase in number of stepping motors is not preferred.

Moreover, a large-sized movable accessory may be installed in the game machine so as to enhance the player's interest. Driving such a movable accessory requires a motor with high torque. However, increasing the torque of the stepping motor necessitates increasing the size of the stepping motor itself, which might result in making the arrangement space more difficult to ensure.

On the other hand, there are generally available motors such as a direct current motor. A price of the direct current motor is lower than that of the stepping motor, and for exertion of the same torque as that of the stepping motor, the direct current motor may be made be smaller in size than the stepping motor. However, the direct current motor cannot directly designate a rotation amount. Therefore, even when electric power that drives the direct current motor remains unchanged, a rotation amount per unit time, namely a rotational speed, changes depending on a load that is applied to the direct current motor.

SUMMARY

In an embodiment, there is provided a drive control device for a direct current motor which drives a movable body provided in a game machine. The drive control device is adapted for rotating the direct current motor in one of a first rotational direction and a second rotational direction at a time. The drive control device comprises:

a storage circuit configured to store a reference rotational speed table indicating a relation between an amount of electric power per unit time which is supplied to the direct current motor and a reference value of a rotational speed of the direct current motor;

a drive signal generation circuit configured to generate a drive signal in accordance with the electric power amount per unit time and output the drive signal to the direct current motor; and a control circuit configured to:

calculate a first correction value that cancels a difference between a first rotational speed which is the reference value of the rotational speed of the direct current motor, and a second rotational speed which is an actual rotational speed at the time of making the drive signal generation circuit output a drive signal in accordance with a first electric power amount corresponding to the first rotational speed according to the reference rotational speed table and rotating the direct current motor in the first rotational direction, correct the reference value of the rotational speed which is stored in the reference rotational speed table based on the first correction value to create a first rotational speed table indicating a relation between an electric power amount per unit time and a rotational speed of the direct current motor concerning the first rotational direction, determine an electric power amount per unit time which corresponds to a first designated rotational speed according to the first rotational speed table upon designation to rotate the direct current motor in the first rotational direction, and notify the drive signal generation circuit of the determined electric power amount to generate a drive signal for rotating the direct current motor in the first rotational direction, The control circuit may be configured to:

calculate a second correction value that cancels a difference between the first rotational speed and a third rotational speed which is an actual rotational speed at the time of making the drive signal generation circuit output a drive signal in accordance with the first electric power amount according to the reference rotational speed table, and rotate the direct current motor in the second rotational direction, wherein when an absolute value of a difference between the third rotational speed and the second rotational speed is equal to or larger than a predetermined threshold, the control circuit is further configured to:

correct the reference value of the rotational speed which is stored in the reference rotational speed table based on the second correction value to create a second rotational speed table indicating a relation between an electric power amount per unit time and a rotational speed of the direct current motor concerning the second rotational direction, determine an electric power amount per unit time which corresponds to a second designated rotational speed according to the second rotational speed table upon designation to rotate the direct current motor in the second rotational direction, and notify the drive signal generation circuit of the determined electric power amount to generate a drive signal for rotating the direct current motor in the second rotational direction.

DETAILED DESCRIPTION

A drive control device according to an embodiment has an effect of being capable of rotating a direct current motor at a desired rotational speed regardless of a load that is applied to the direct current motor. Hereinafter, a drive control device according to an embodiment will be described with reference to the drawings.

Figure 1A:
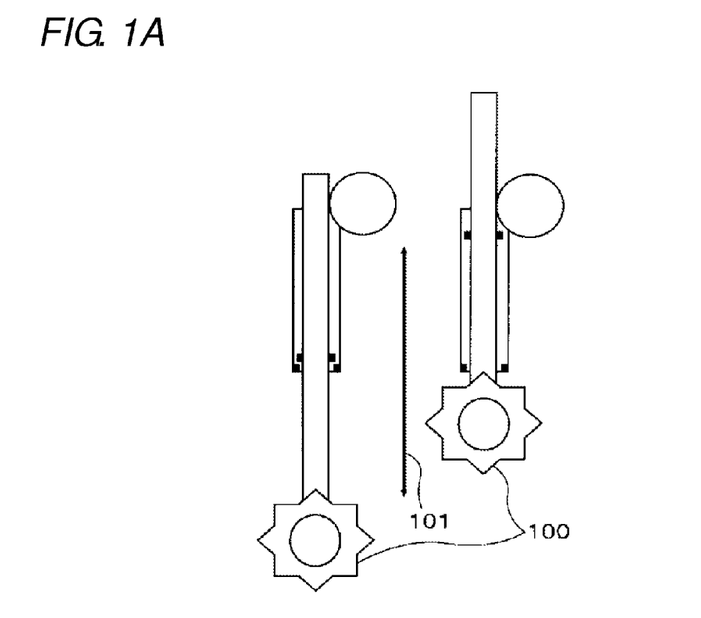
FIG. 1A is a diagram showing one example of a movable accessory driven by a direct current motor.

First, a description will be given of an example of a movable accessory with which a load varies depending on a rotational direction of a direct current motor (hereinafter referred to as DC motor), or the like. FIG. 1A is a view showing an example of a movable accessory 100 with which a load varies depending on a rotational direction, and FIG. 1B is a view showing an example of a movable accessory 110 with which a load varies depending on its position.

The movable accessory 100 shown in FIG. 1A is arranged in a game board (not shown) so as to move along a vertical direction as shown with arrow 101. Therefore, due to the gravity, a load which is applied to the DC motor for driving the movable accessory 100 at the time of the movable accessory 100 moving downward is smaller than a load at the time of the movable accessory 100 moving upward.

Figure 1B:
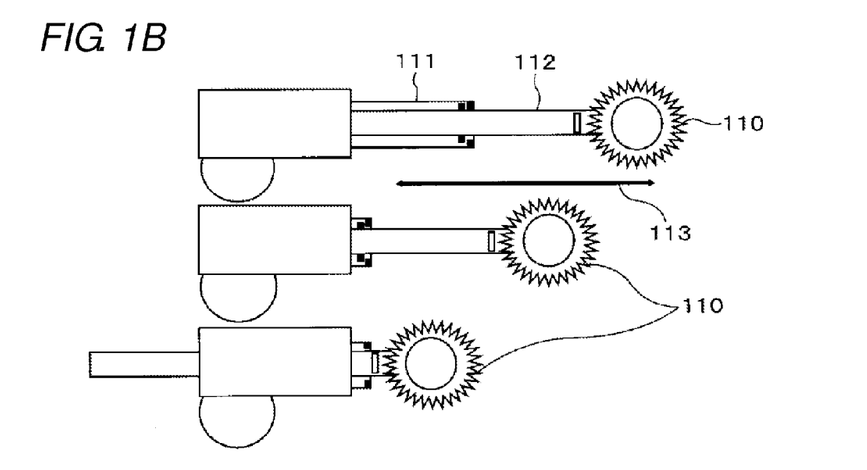
FIG. 1B is another example of the movable accessory driven by the direct current motor.

The movable accessory 110 shown in FIG. 1B is arranged on the game board movably along a horizontal direction as shown in arrow 113, but it has a two-step extension/retraction structure which is adapted to extend and retract the movable accessory 110 in the horizontal direction. Therefore, a load that is applied to the DC motor in the case of the movable accessory 110 being located in a range where both rear-side member 111 and top-side member 112 of the movable accessory 110 move together is larger than a load that is applied to the DC motor in the case of the movable accessory 110 being located in a range where only the top-side member 112 moves.

Therewith, the drive control device previously stores a reference rotational speed table indicating the relation between a reference value of a rotational speed of the DC motor and an amount of electric power that is supplied to the DC motor. An example of the reference rotational speed table is described in the following description with reference to FIG. 6. The drive control device measures, for example at its start-up or the like, an actual rotational speed of the DC motor at the time of supplying the DC motor with an electric power amount corresponding to a predetermined rotational speed specified in the reference rotational speed table. The drive control device then calculates a correction value of the electric power amount so as to cancel a difference between the actual rotational speed and the predetermined rotational speed. Using the correction value, the drive control device corrects the rotational speed corresponding to each electric power amount which is stored in the reference rotational speed table, thereby to create a rotational speed table for normal operation time. Further, in order to cope with a case where a load that is applied to the DC motor is different between when the DC motor is rotated clockwise and when it is rotated counterclockwise, the drive control device separately creates a rotational speed table for forward rotation and a rotational speed table for backward rotation when a rotational speed in a forward rotational direction and a rotational speed in a backward rotational direction are different to a certain degree or more at the time of supplying the DC motor with the same electric power amount. An example of a rotational speed table is described in the following description with reference to FIG. 8.

Figure 2:
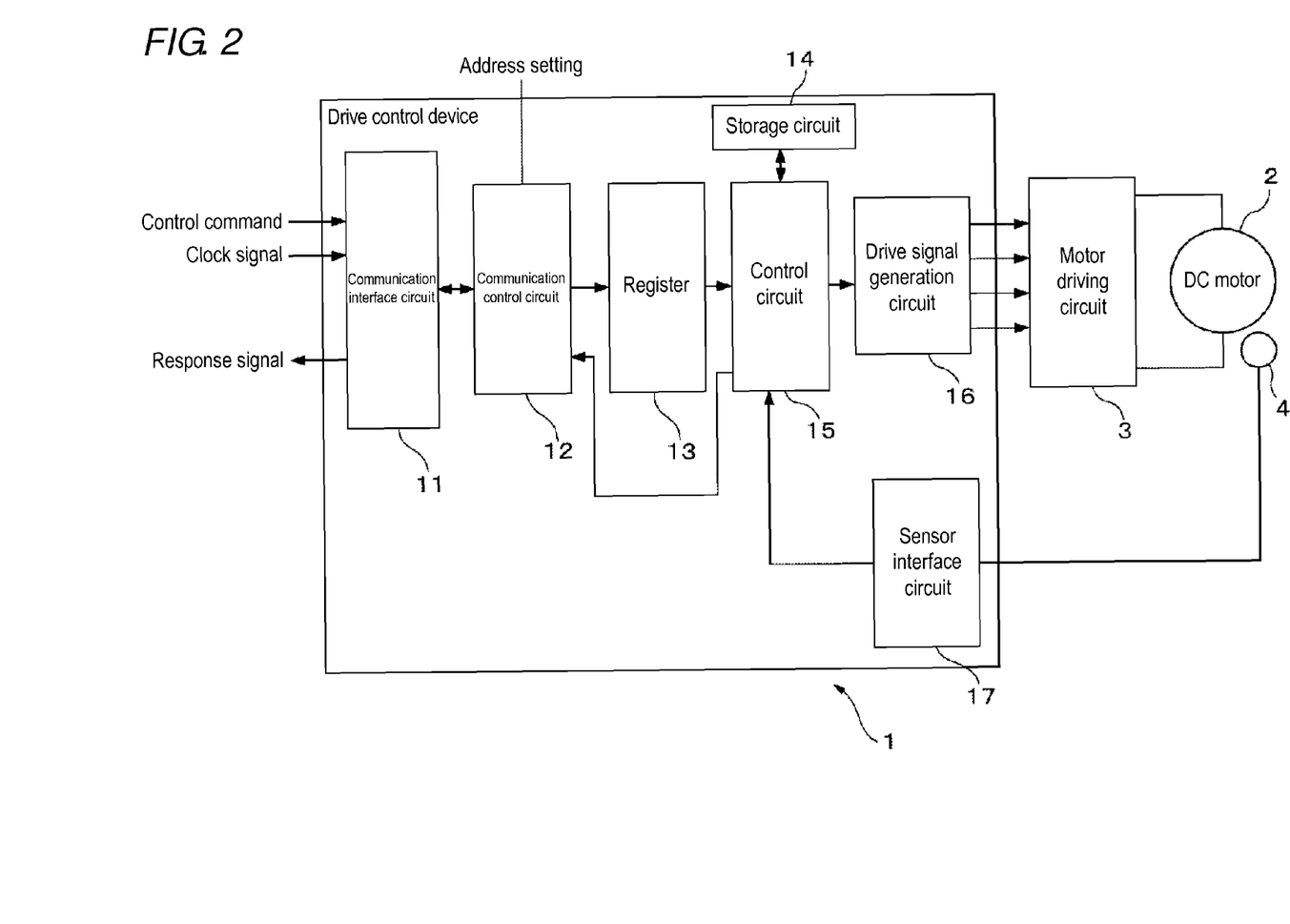
FIG. 2 is a schematic constitutional diagram of a drive control device according to one embodiment.

FIG. 2 is a schematic constitutional diagram of a drive control device 1 according to one embodiment of the present invention. As shown in FIG. 2, the drive control device 1 has a communication interface circuit 11, a communication control circuit 12, a register 13, a storage circuit 14, a control circuit 15, a drive signal generation circuit 16, and a sensor interface circuit 17.

Each of these parts provided in the drive control device 1 may be mounted on a circuit substrate (not shown) as a separate circuit, or may be mounted on the circuit substrate as an integrated circuit where each of these parts is integrated.

The drive control device 1 outputs a pulse-like drive signal to the motor driving circuit 3 that supplies a current to DC motor 2 as a controlled object. The pulse-like drive signal switches on-off of the current supply to an arbitrary coil or the like of the DC motor 2, according to a control command received from a performance CPU (not shown), thereby to the control DC motor 2. In an embodiment, the drive control device 1 may be configured to control the current supply to the DC motor 2 by a pulse width modulation (PWM) system, so as to rotate the DC motor 2 at a target rotational speed designated by the control command. Therefore, the drive control device 1 changes a pulse width per cycle, namely a duty ratio, of a drive signal in accordance with the target rotational speed. This duty ratio shows an amount of electric power per unit time which is supplied to the DC motor 2.

Further, in order to rotate the DC motor 2 only by a target rotation amount, every time a rotational shaft (not shown) of the DC motor 2 is rotated at a predetermined angle, the drive control device 1 receives from the rotary encoder 4 a detection signal showing that the rotational shaft has been rotated at the predetermined angle, and calculates a total rotational amount from the start of rotation. When the total rotation amount of the DC motor 2 reaches the target rotation amount, namely after the movable body driven by the DC motor 2 is moved just a predetermined distance, the drive control device 1 stops the DC motor 2.

Figure 3:
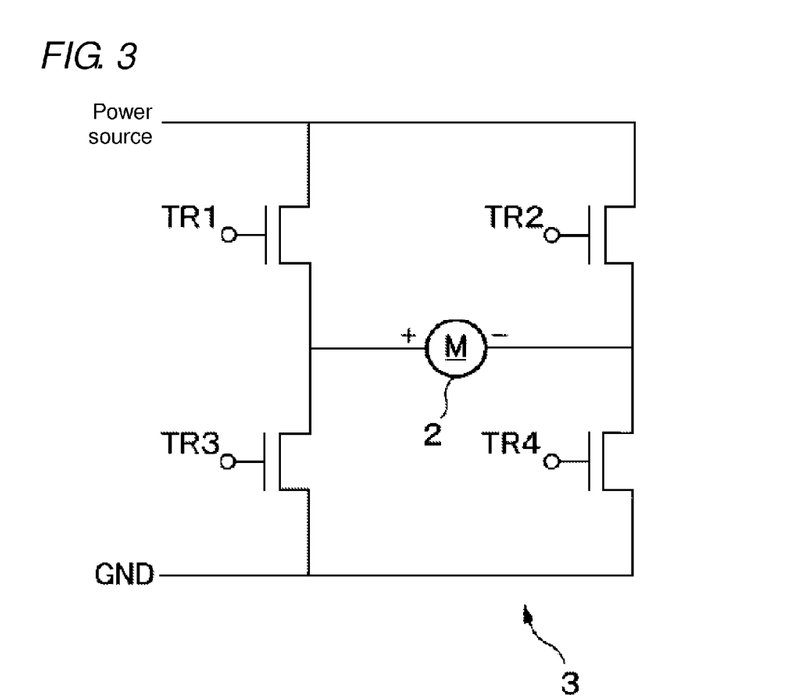
FIG. 3 is a circuit diagram of a motor driving circuit.

FIG. 3 is a circuit diagram of the motor driving circuit 3. The motor driving circuit 3 has four switches TR1 to TR4. It is to be noted that each switch can, for example, be a transistor or a field effect transistor. Among them, two switches TR1 and TR3 are connected in series between a power source and a ground. Similarly, two switches TR2 and TR4 are connected in series between the power source and the ground. A positive-electrode-side terminal of the DC motor 2 is connected between switch TR1 and switch TR3, whereas a negative-electrode-side terminal of the DC motor 2 is connected between switch TR2 and switch TR4. A switch terminal of each of switches TR1 to TR4 (e.g., it corresponds to a base terminal when each of switches TR1 to TR4 is the transistor, and it corresponds to a gate terminal when each of switches TR1 to TR4 is the field effect transistor) is connected to a drive signal generation circuit 16. The drive signal from the drive signal generation circuit 16 is then inputted into the switch terminal of each of switches TR1 to TR4.

Figure 4:
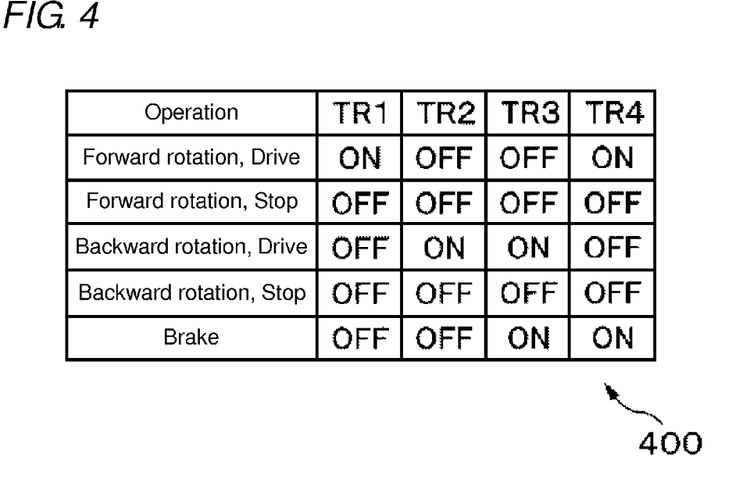
FIG. 4 is a diagram showing one example of a table indicating the relation between a drive signal that is applied to each switch of the motor driving circuit and a rotational direction of the DC motor.

FIG. 4 is a diagram showing one example of a table 400 indicating the relation between the drive signal that is applied to each switch of the motor driving circuit 3 and the rotational direction of the DC motor 2.

As shown in the table 400, in the case of rotating the DC motor 2 forward, a drive signal is applied to the switch terminal of switch TR1 and the switch terminal of switch TR4, the drive signal having been set according to the PWM system and including a cyclic pulse with a pulse width in accordance with the rotational speed of the DC motor 2. On the other hand, the drive signal is not applied to the switch terminal of switch TR2 and the switch terminal of switch TR3. Accordingly, since a power supply voltage is applied to the positive-electrode-side terminal in the DC motor 2 only during application of pulses to switch TR1 and switch TR4, the DC motor 2 is rotated forward at a speed in accordance with the pulse width.

It is to be noted that in the case of rotating the DC motor 2 forward, the drive signal may be applied to one of switch TR1 and switch TR4, and the other switch may be constantly turned on.

On the other hand, in the case of rotating the DC motor 2 backward, a drive signal is applied to the switch terminal of switch TR2 and the switch terminal of switch TR3, the drive signal having been set according to the PWM system and having a cyclic pulse in accordance with the rotational speed of the DC motor 2. On the other hand, the drive signal is not applied to the switch terminal of switch TR1 and the switch terminal of switch TR4. Accordingly, since a power supply voltage is applied to the negative-electrode-side terminal in the DC motor 2 only during application of pulses to switch TR2 and switch TR3, the DC motor 2 is rotated backward at a speed in accordance with the pulse width.

It is to be noted that in the case of rotating the DC motor 2 backward, the drive signal may be applied to one of switch TR2 and switch TR3, and the other switch may be constantly turned on.

Further, in the case of applying a brake to the DC motor 2, the switch terminal of switch TR3 and the switch terminal of switch TR4 are turned on, and the switch terminal of switch TR1 and the switch terminal of switch TR2 are turned off.

Further, in the case of not driving the DC motor 2, the switch terminal of each switch is turned off.

The rotary encoder 4 is one example of a rotational angle sensor, and for example, it can be an optical rotary encoder. The rotary encoder 4, for example, has: a disk fitted to the rotational shaft of the DC motor 2 as the controlled object and having a plurality of slits along a circumferential direction centered with the rotational shaft; and a light source and a light receiving element which are arranged so as to be opposed to each other with the disk placed therebetween. Then, every time any of the slits is located between the light source and the light receiving element, light from the light source reaches the light receiving element, and the rotary encoder 4 thereby outputs a pulse-like detection signal. Accordingly, the rotary encoder 4 outputs the detection signal every time the DC motor 2 is rotated at a predetermined angle. For example, 50 slits are provided in the disk along the circumferential direction centered with the rotational shaft of the DC motor 2, and the rotary encoder 4 thereby outputs 50 detection signals while the rotational shaft of the DC motor 2 makes one rotation.

A communication interface circuit 11, for example, connects the drive control device 1 with the performance CPU of the game machine via a signal line. The communication interface circuit 11 then receives from the performance CPU a control command having a plurality of bits serially transmitted via the signal line. Further, for analyzing the control command, the communication interface circuit 11 receives a clock signal for making synchronization with each of the plurality of bits included in the control command from the performance CPU via the signal line. The communication interface circuit 11 then outputs the control command and the clock signal to the communication control circuit 12. Further, the communication interface circuit 11 outputs a response signal, received from the communication control circuit 12 and to be transmitted to the performance CPU, to the performance CPU via the signal line.

The clock signal can, for example, be a signal having a rectangular pulse with respect to each predetermined number of bits in the control command.

The control command includes: a drive command to specify an operation of DC motor 2 as the controlled object; and an information acquirement request command to make a request to the drive control device 1 for transmitting, to the performance CPU, information indicating a state of the DC motor 2 or information indicating a state of the movable body driven by the DC motor 2.

The drive command, for example, includes operation information for specifying the operation of the DC motor 2, such as a target rotation amount of the DC motor 2 which specifies one operation of the DC motor 2 as the controlled object and corresponds to a movement amount of the movable body that is driven by the DC motor 2, and a rotational speed which corresponds to a moving speed of the movable body. In the meantime, the information acquirement request command, for example, includes a flag indicating the kind of information which the performance CPU wants to acquire, and the like.

Figure 5:
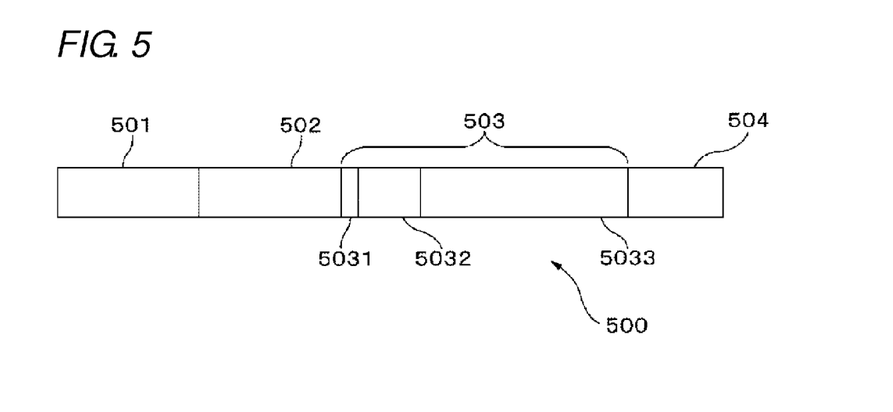
FIG. 5 is a diagram showing one example of a format of a drive command.

FIG. 5 is a diagram showing one example of a format of the drive command. As shown in FIG. 5, a drive command 500 has a START flag 501, a device address 502, a control data 503 and an END flag 504, sequentially from the head. Further, the drive command 500 may, for example, include a one-bit spacer having a value of '0' in each space among the adjacent flag, address and data.

The START flag 501 is a bit stream indicating to be the head of the drive command 500, and in the present embodiment, it is a bit stream of nine continuous bits each having a value of '1'. It should be noted that the START flag 501 may only be a bit stream not agreeing with any other arbitrary bit stream within the drive command 500.

The device address 502 is identification information for specifying a drive control device which the drive command 500 takes as a controlled object, and in the present embodiment, it is expressed by a bit stream having a length of eight bits.

The control data 503 includes operation information for the DC motor 2 that is controlled by the drive control device 1. Specifically, the control data 503 includes a rotational direction flag 5031, speed data 5032 and rotation amount data 5033.

The rotational direction flag 5031 is a one-bit flag indicating the rotational direction of the DC motor 2. In the present embodiment, when the rotational direction flag 5031 is '0', the drive control device 1 rotates the DC motor 2 forward, and when the rotational direction flag 5031 is '1', the drive control device 1 rotates the DC motor 2 backward.

The speed data 5032 indicates the target rotational speed of the DC motor 2. In the present embodiment, the speed data 5032 is a bit stream having a length of four bits, and is any value of '0' to '15'. When the speed data 5032 is '0', it indicates applying a brake to DC motor 2. That is, it indicates outputting a brake signal that turns on switches TR3 and TR4 of the motor driving circuit 3. When the speed data 5032 is '1' to '15', it indicates rotating the DC motor 2 at the target rotational speed found from the value of that speed data 5032. It is to be noted that, in this example, the larger the value of the speed data 5032, the faster the target rotational speed.

The rotation amount data 5033 indicates the target rotation amount of DC motor 2. In the present embodiment, the rotation amount data 5033 is a bit stream having a length of 13 bits. The rotation amount data 5033 expresses the target rotation amount with the number of detection signals received from the rotary encoder 4. That is, a value, obtained by multiplying the value indicated in the rotation amount data 5033 by a central angle between adjacent slits of the rotary encoder 4, is an actual target rotation amount of the DC motor 2.

A END flag 504 is a bit stream indicating to be the tail of the drive command 500. The END flag 504 may only be a bit stream not agreeing with the START flag and the other bit streams included in the drive command.

When the control command received via the communication interface circuit 11 is the drive command, the communication control circuit 12 determines whether or not the drive command is addressed to its own device. When it is addressed to its own device, the communication control circuit 12 writes operation information and the like, included in the drive command, into the register 13. On the other hand, when the drive command is not addressed to its own device, the communication control circuit 12 discards the received drive command.

In order to determine whether or not the drive command is addressed to its own device, the communication control circuit 12 determines whether or not a device address included in the drive command agrees with the address set to the drive control device 1. When the device address agrees with the set address, the communication control circuit 12 determines that the drive command is addressed to its own device.

It should be noted that the address set to drive the control device 1 may, for example, be previously written into a non-volatile memory in the communication control circuit 12. Alternatively, the communication control circuit 12 may have a plurality of address terminals for address setting. In this case, each address terminal corresponds to each digit of binary digits, and a value of a digit corresponding to an address terminal being grounded is set as '0', and a value of a digit corresponding to an address terminal not being grounded is '1'. Accordingly, an arbitrary address is set to the drive control device 1 by changing a combination of grounded address terminals.

In the meantime, upon reception of the information acquirement request command from the performance CPU, the communication control circuit 12 acquires information specified by the information acquirement request command from the control circuit 15 or the register 13. The communication control circuit 12 then creates a response signal including that information and outputs the response signal to the performance CPU.

The register 13 has a memory circuit in what is called a first-in first-out (FIFO) system, which has a storage capacity capable of storing at least one piece of operation information. The memory circuit in the register 13 is, for example, made up of a volatile readable/writable semiconductor memory circuit.

The register 13 stores the operation information written by the communication control circuit 12. When the operation information is read by the control circuit 15, the register 13 deletes the operation information.

The storage circuit 14, for example, has a nonvolatile memory circuit and volatile memory circuit. The storage circuit 14 then stores a reference rotational speed table indicating the relation between a duty ratio of the drive signal, which corresponds to an amount of electric power per unit time that is supplied to DC motor 2, and a corresponding reference value of the rotational speed of DC motor 2.

Figure 6:
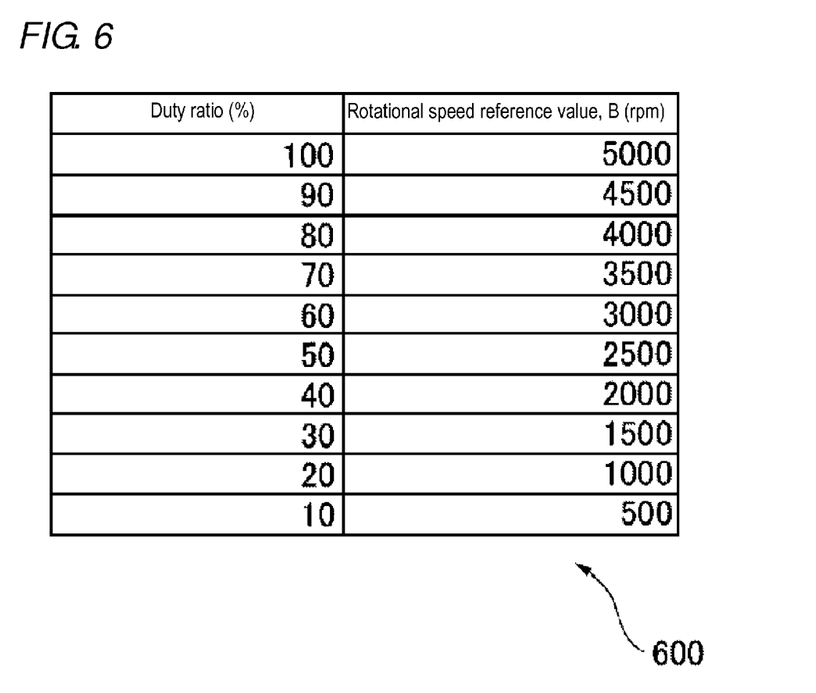
FIG. 6 is a diagram showing one example of a reference rotational speed table.

FIG. 6 is a diagram showing one example of a reference rotational speed table 600. A duty ratio (unit: %) is stored in each of left-side columns of the reference rotational speed table 600, and a reference value (unit: rpm) of a rotational speed which corresponds to the duty ratio stored in the column to the left thereof is stored in each of right-side columns. It is to be noted that the reference value of the rotational speed can, for example, be a rotational speed with respect to each duty ratio in the case of a predetermined load being applied to the DC motor. This DC motor is not restricted to the DC motor actually driven by the control device 1 but any of a variety of commercially available DC motors or a virtual DC motor. Further, the predetermined load can, for example, be 0 or any value within a range of a load that is assumed in the case of driving the movable accessory mounted in the game machine by the DC motor 2.

Further, the storage circuit 14 stores a rotational speed table that is created based on the reference rotational speed table by a rotational speed table creation process. The rotational speed table indicates the relation between the duty ratio of the drive signal and a corresponding actual rotational speed of the DC motor 2. It is to be noted that a detail of the rotational speed table creation process will be described later, for example, with reference to FIG. 7.

The control circuit 15, for example, has a processor and a peripheral circuit. The control circuit 15 executes the rotational speed table creation process, thereby to create the rotational speed table from the reference rotational speed table. Further, with reference to operation information read from the register 13, the control circuit 15 finds a bit stream of a target rotational speed designated in the operation information, and with reference to a table (not shown) indicating the relation between a bit stream and a rotational speed, the control circuit 15 specifies a rotational speed corresponding to a value of the bit stream. With reference to the rotational speed table, the control circuit 15 determines a duty ratio of the drive signal which corresponds to the rotational speed. At that time, when the rotational speed designated in the operation information does not agree with any of the rotational speeds stored in the rotational speed table, the control circuit 15 may detect two rotational speeds which are the closest to the rotational speed designated in the rotational speed table. Then, the control circuit 15 may perform linear interpolation on two duty ratios corresponding to those two rotational speeds, thereby to determine a duty ratio corresponding to the designated rotational speed. Then, the control circuit 15 notifies the drive signal generation circuit 16 of the rotational direction designated in the operation information and the duty ratio.

Further, during execution of the drive command, the control circuit 15 determines a difference between an actual rotational speed of DC motor 2 with respect to the designated duty ratio and the rotational speed specified in the rotational speed table by so-called feedback control. The control circuit 15 then determines a correction amount of the duty ratio for cancelling the difference, and corrects the duty ratio in accordance with the correction amount.

First, a rotational speed table creation process will be described.

Figure 7:
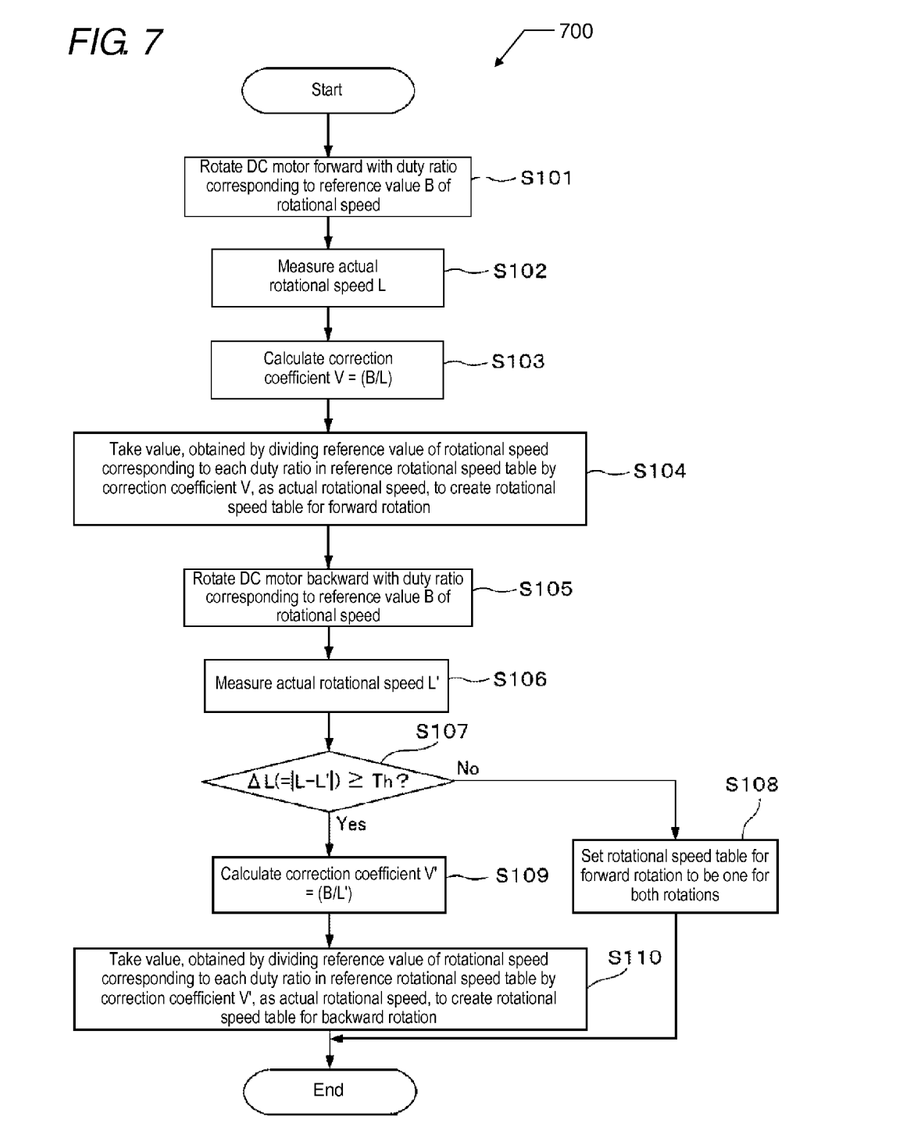
FIG. 7 is an operation flowchart of a rotational speed table creation process.

FIG. 7 is an operation flowchart of a rotational speed table creation process. The control circuit 15, for example, executes the rotational speed table creation process according to this operation flowchart on arbitrary timing when a game has not been executed, for example at the start-up of the game machine. It should be noted that the control circuit 15 may execute the rotational speed table creation process at every start-up of the game machine, or it may execute the rotational speed table creation process only at the shipment of the game machine, only once a week or a month. Further, the control circuit 15 may execute the rotational speed table creation process while a game is not executed every time a predetermined period (e.g., 6 hours, 12 hours, 24 hours) elapses after execution of the previous rotational speed table creation process, or every time an environmental condition changes from an environmental condition in executing the previous rotational speed table creation process by more than a certain degree (e.g., a temperature around the game board changes by not less than 30° C.)

The control circuit 15 notifies the drive signal generation circuit 16 of a duty ratio corresponding to a reference value B of the rotational speed (first rotational speed) specified in the reference rotational speed table. The control circuit 15 then outputs a drive signal in accordance with the duty ratio to the motor driving circuit 3, and rotates the DC motor 2 forward (Step S101). It is to be noted that the duty ratio corresponding to the reference value B of the rotational speed is, for example, 100% or a frequently used duty ratio such as 60% to 70%.

The control circuit 15 measures an actual rotational speed L (second rotational speed) of the DC motor 2 at the time of the forward rotation based on the number of detection signals received from the rotary encoder 4 per predetermined unit time during driving of the DC motor 2 with the above predetermined duty ratio (Step S102). The control circuit 15 then calculates a ratio (B/L) of the reference value B of the rotational speed with respect to the above duty ratio, which is stored in the reference rotational speed table, to an actual rotational speed L, as a correction coefficient V (first correction value) that cancels the difference between the actual rotational speed L and the reference value B (Step S103). For example, as shown in FIG. 6, it is assumed that a predetermined duty ratio is 100% and the reference value B of the rotational speed which corresponds to the duty ratio is 5000 rpm. In this case, when it is assumed that the actual rotational speed of the DC motor 2 is 4000 rpm, the correction coefficient V=(5000/4000)=1.25.

When finding the correction coefficient V, the control circuit 15 divides the reference value of the rotational speed corresponding to each duty ratio, which is stored in the reference rotational speed table, by the correction coefficient V to estimate an actual rotational speed with respect to each duty ratio. The control circuit 15 then creates a rotational speed table for forward rotation (first rotational speed table) which indicates the relation between each duty ratio and the corresponding actual rotational speed in the case of forward rotation of the DC motor 2 (Step S104). The control circuit 15 then writes the first rotational speed table into the storage circuit 14 along with a flag corresponding to forward rotation.

Figure 8:
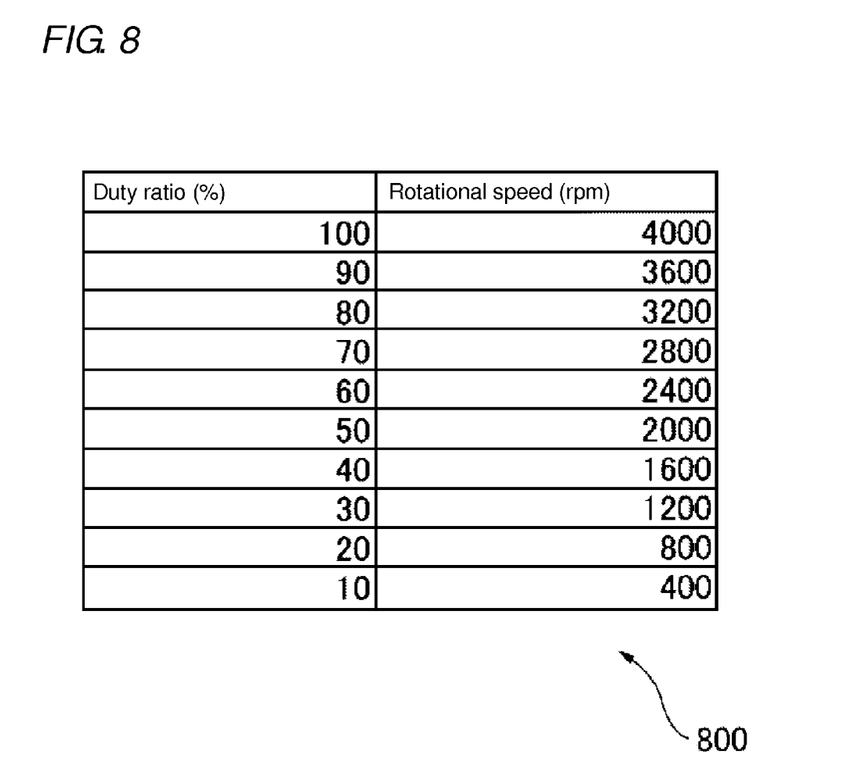
FIG. 8 is a diagram showing one example of a rotational speed table.

FIG. 8 is a diagram showing one example of a rotational speed table such as the first rotational speed table which is created using the rotational speed table creation process of FIG. 7. In each of left-side columns of a rotational speed table 800 shown in FIG. 8, a duty ratio (unit: %) is stored, and in each of right-side columns, a rotational speed (unit: rpm) is stored which corresponds to the duty ratio stored in the column to the left thereof. It is to be noted that the rotational speed table 800 is one obtained by correcting the rotational speed with respect to each duty ratio in the reference rotational speed table 600 shown in FIG. 6, by use of the correction coefficient V=1.25.

Again with reference to FIG. 7, the control circuit 15 notifies the drive signal generation circuit 16 of the duty ratio corresponding to the reference value B of the rotational speed which is specified in the reference rotational speed table. The control circuit 15 then outputs a drive signal in accordance with the duty ratio to the motor driving circuit 3, to rotate the DC motor 2 backward (Step S105). It should be noted that this duty ratio is the same as the duty ratio at the time of rotating the DC motor 2 forward in Step S101. The control circuit 15 measures an actual rotational speed L' (third rotational speed) of the DC motor 2 at the time of the backward rotation based on the number of detection signals received from the rotary encoder 4 per predetermined unit time during driving of the DC motor 2 with the above predetermined duty ratio (Step S106). The control circuit 15 then determines whether or not an absolute value ΔL (=|L−L'|) of the difference between the rotational speed L at the time of the forward rotation and the rotational speed L' at the time of the backward rotation in the duty ratio is equal to or larger than a predetermined threshold Th (Step S107). It is to be noted that, for example by correcting the duty ratio by the feedback control at the time of executing the drive command, the predetermined threshold Th is set to an upper limit of the difference in a rotational speed, e.g., 2000 rpm, which can determine a duty ratio based on the rotational speed table which is the same at the time of forward rotation and at the time of backward rotation. When ΔL is smaller than (i.e. not equal to, or not larger than) the predetermined threshold Th (Step S107—No), the control circuit 15 can use the same rotational speed table at the time of the forward rotation and at the time of backward rotation. For this reason, the control circuit 15 sets the rotational speed table (the first rotational speed table) for both forward rotation and backward rotation, while associating a flag that corresponds to backward rotation with the rotational speed table already stored in the storage circuit 14 (Step S108). Thereafter, the control circuit 15 completes the rotational speed table creation process.

On the other hand, when ΔL is equal to or larger than (not smaller than) the predetermined threshold Th (Step S107—Yes), the control circuit 15 cannot use the same rotational speed table (the first rotational speed table) at the time of forward rotation and at the time of backward rotation. Therewith, the control circuit 15 calculates a ratio (B/L') of reference value B of the rotational speed with respect to actual rotational speed L' as a correction coefficient V' (second correction value) that cancels the difference between actual rotational speed L' and reference value B (Step S109). The control circuit 15 then divides the reference value of the rotational speed corresponding to each duty ratio, which is stored in the reference rotational speed table, by correction coefficient V' to estimate an actual rotational speed with respect to each duty ratio. The control circuit 15 then creates a rotational speed table for backward rotation which indicates the relation between each duty ratio and the corresponding actual rotational speed in the case of backward rotation of the DC motor 2 (Step S110). The control circuit 15 then writes the rotational speed table into the storage circuit 14 along with a flag corresponding to backward rotation. Thereafter, the control circuit 15 completes the rotational speed table creation process.

When creating the rotational speed table, the control circuit 15 selects a rotational speed table to be used in accordance with a rotational direction designated in operation information of a drive command at the time of execution of the drive command. With reference to the selected rotational speed table, the control circuit 15 determine a duty ratio corresponding to the rotational direction designated in the operation information of the drive command, and notifies the drive signal generation circuit 16 of the duty ratio and the rotational direction. Accordingly, the drive signal generation circuit 16 outputs to the motor driving circuit 3 a PWM signal that rotates the DC motor 2 in the designated rotational direction and has the above duty ratio. At this time, based on a detection signal received from the rotary encoder 4, the control circuit 15 measures an actual rotational speed of the DC motor 2 being driven, to find a correction amount of the duty ratio according to the need. The control circuit 15 then corrects the duty ratio by use of the correction amount, thereby holding the rotational speed of the DC motor 2 to be the rotational speed designated by the drive command.

Figure 9:
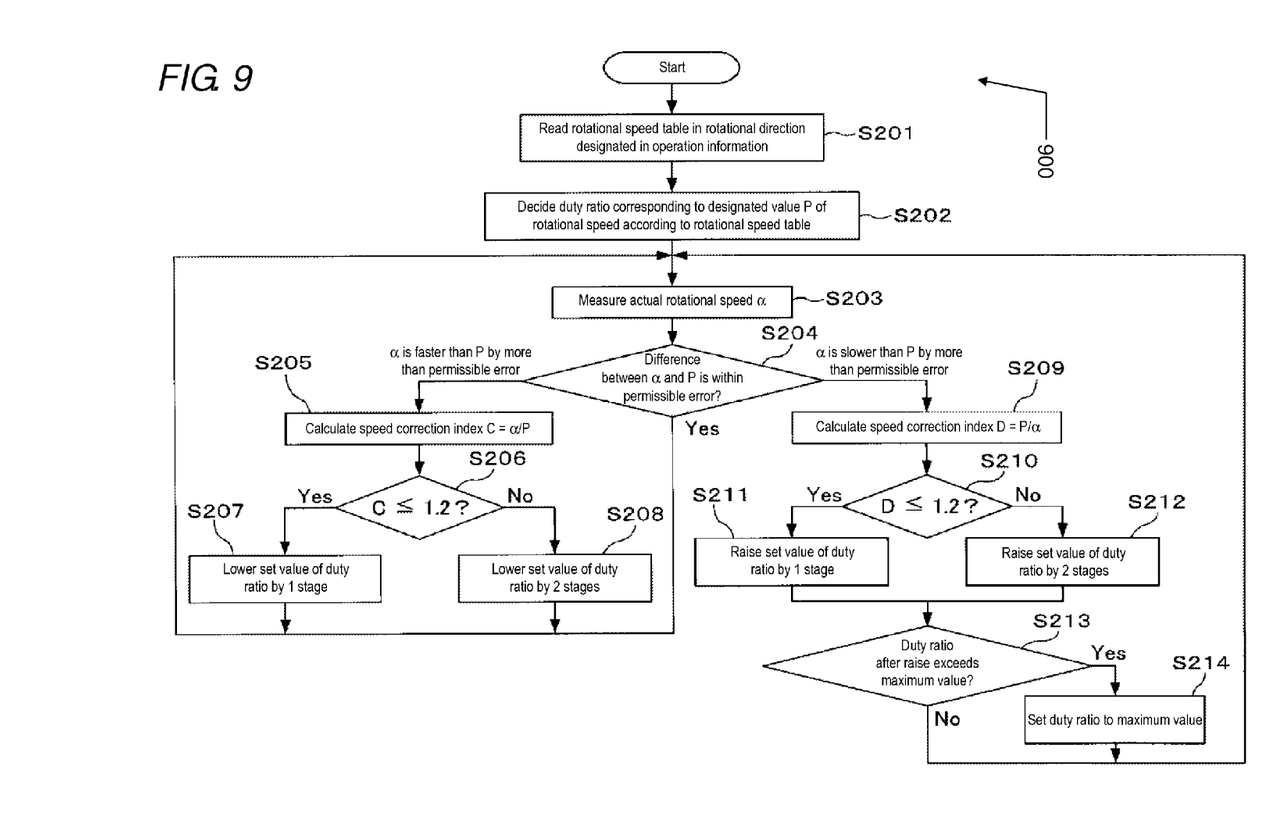
FIG. 9 is an operation flowchart of a rotational speed adjustment process.

FIG. 9 is an operation flowchart of a rotational speed adjustment process. During operation of the DC motor 2, the control circuit 15 determine a duty ratio so as to hold a rotational speed designated by a drive command constant according to this operation flowchart.

In accordance with a rotational direction flag included in the operation information read from the register 13, the control circuit 15 reads from the storage circuit 14 a rotational speed table corresponding to a rotational direction designated in the operation information (Step S201). With reference to the read rotational speed table, the control circuit 15 determines a duty ratio corresponding to a designated value P of the rotational speed included in the operation information (Step S202). The control circuit 15 measures actual rotational speed a of the DC motor 2 based on the number of detection signals received from the rotary encoder 4 per predetermined unit time during driving of the DC motor 2 with the above predetermined duty ratio (Step S203). It is to be noted that the unit time is set to time, which is sufficiently shorter than the time required for completing an operation designated by one operation command, e.g., 100 msec to 500 msec. The control circuit 15 then compares measured value α of the rotational speed with designated value P of the rotational speed designated in the operation information (Step S204).

When the difference between measured value α and designated value P is not larger than (smaller or equal to) a permissible error (predetermined error value) of the rotational speed, the control circuit 15 repeats processing of and after Step S203.

On the other hand, when measured value a is faster than designated value P by more than the permissible error of the rotational speed, the control circuit 15 calculates a ratio (α/P) of measured value α to designated value P as speed correction index C (Step S205). The control circuit 15 then determines whether or not speed correction index C is not larger than 1.2 (Step S206). When speed correction index C is not larger than 1.2 (Step S206—Yes), the control circuit 15 lowers the set value of the duty ratio from the current set value by one stage on the rotational speed table (Step S207).

On the other hand, when speed correction index C is larger than 1.2 (Step S206—No), the control circuit 15 lowers the set value of the duty ratio from the current set value by two stages on the rotational speed table (Step S208).

After Step S207 or S208, the control circuit 15 repeats processing of and after Step S203.

Further, when measured value α is slower than designated value P by more than the permissible error of the rotational speed, the control circuit 15 calculates a ratio (P/α) of designated value P to measured value a as speed correction index D (Step S209). The control circuit 15 then determines whether or not speed correction index D is not larger than 1.2 (Step S210). When speed correction index D is not larger than 1.2 (Step S210—Yes), the control circuit 15 raises the set value of the duty ratio from the current set value by one stage on the rotational speed table (Step S211).

On the other hand, when speed correction index D is larger than 1.2 (Step S210—No), the control circuit 15 raises the set value of the duty ratio from the current set value by two stages on the rotational speed table (Step S212).

After Steps S211 or S212, the control circuit 15 determines whether or not the duty ratio after the raise exceeds the maximum value (e.g., 100%) of the duty ratio specified in the rotational speed table (Step S213). When the duty ratio after the raise exceeds the maximum value of the duty ratio specified in the rotational speed table (Step S213—Yes), the control circuit 15 sets the duty ratio to the maximum value (Step S214). In Step S212, when the duty ratio after the raise is not larger than the maximum value of the duty ratio specified in the rotational speed table (Step S213—No), or after Step S214, the control circuit 15 repeats processing of and after Step S203.

Furthermore, every time the control circuit 15 executes a drive command, it counts the number of detection signals received from rotary encoder 4 after the DC motor 2 starts rotation by execution of the command, and takes a total number of received detection signals as a total rotation amount of the DC motor 2. The control circuit 15 then stores the total rotation amount into the storage circuit 14.

Every time the control circuit 15 updates the total rotation amount of the DC motor 2, it calculates the difference between the total rotation amount and the target rotation amount designated in rotation amount data included in the command, as a remaining rotation amount. It is to be noted that, when the remaining rotation amount becomes smaller than the predetermined threshold, the control circuit 15 may make the duty ratio of the drive signal smaller than the duty ratio corresponding to the target rotational speed. When the remaining rotation amount becomes 0, namely when the DC motor 2 is rotated just in the target rotation amount designated by the drive command, the control circuit 15 designates drive the signal generation circuit 16 to stop the DC motor 2.

The drive signal generation circuit 16, for example, has: a variable pulse generation circuit capable of changing a pulse width to be outputted; and a switch circuit for changing which switch of the motor driving circuit 3 a cyclic pulse signal is to be outputted to, the pulse signal having been generated by the variable pulse generation circuit and being a drive signal. The drive signal generation circuit 16 then generates a drive signal for driving the DC motor 2 in accordance with the duty ratio notified from the control circuit 15 according to the PWM system, and outputs the drive signal to any of the switches of the motor driving circuit 3. It is to be noted that a length of one period of the drive signal is, for example, 50 μsec. For example, when the rotational direction notified from the control circuit 15 is forward rotation, the drive signal generation circuit 16 outputs the cyclic pulse signal to switches TR1 and TR4 of the motor driving circuit 3. On the other hand, when the rotational direction notified from the control circuit 15 is backward rotation, the drive signal generation circuit 16 outputs the cyclic pulse signal to switches TR2 and TR3 of the motor driving circuit 3.

The sensor interface circuit 17 has an interface circuit that receives a detection signal from the rotary encoder 4. Every time the sensor interface circuit 17 receives a detection signal, it outputs the detection signal to the control circuit 15.

As described above, this drive control device measures a rotational speed with respect to a predetermined duty ratio in each of the forward rotational direction and the backward rotational direction, and creates one or two rotational speed tables in accordance with a measured value of a difference between those rotational speeds. For this reason, when a difference between a load of the DC motor at the time of forward rotation and a load of the DC motor at the time of backward rotation is equal to or larger than a predetermined threshold, the drive control device can accurately rotate the DC motor at a designated rotational speed by using the different rotational speed tables at the time of forward rotation and the time of backward rotation. On the other hand, when the difference between the load of the DC motor at the time of forward rotation and the load of the DC motor at the time of backward rotation is smaller than the predetermined threshold, the drive control device determines a duty ratio by using the same rotational speed table at the time of forward rotation and at the time of backward rotation, thus allowing alleviation of the processing required for deciding the duty ratio. Further, also during execution of a drive command, this drive control device adjusts the duty ratio by the feedback control according to the need, to hold a rotational speed constant. Hence it can rotate the DC motor at a rotational speed designated by the drive command even when a load that is applied to the DC motor varies for some reason between the time of creating the rotational speed table and the time of creating the drive command, or when a load that is applied to the DC motor varies in a position of the movable body to be driven such as the movable accessory shown in FIG. 1B.

According to a modified example, at the time of creating the rotational speed table, the control circuit 15 may measure an actual rotational speed with respect to each of a plurality of duty ratios stored in the reference rotational speed table, and based on its result, the control circuit 15 may create a rotational speed table such that a rotational speed with respect to each duty ratio becomes a measured value of the actual rotational speed. Accordingly, even when there is no proportional relation between the duty ratio and the actual rotational speed, the control circuit 15 can rotate the DC motor 2 at a rotational speed designated by a drive command.

Further, according to another modified example, the control circuit 15 may create a different rotational speed table in accordance with the position of the movable accessory driven by the DC motor 2, and switch a rotational speed table that is used in accordance with that position. For example, as shown in FIG. 1B, when the movable accessory has a two-step extension/retraction structure, a load that is applied to the DC motor 2 varies depending on the position of the movable accessory. Therefore, for example, at the time of executing the rotational speed table creation processing, the control circuit 15 starts getting the movable accessory moved from a reference position, such as one end of a movable range of the movable accessory. The control circuit 15 then measures a rotational speed of the DC motor 2 until the movable accessory reaches a position where the load that is applied to the DC motor 2 changes, thereby to create one rotational speed table. Then, the control circuit 15 may measure the rotational speed of the DC motor 2 again after the movable accessory passes that position, to create another rotational speed table. However, also in this modified example, in the case of the same amount of electric power being supplied to the DC motor 2, when the difference in actual rotational speed in accordance with the position of the movable accessory is smaller than threshold Th, the control circuit may create only one rotational speed table regardless of the position of the movable accessory and use it for controlling the rotational speed of the DC motor 2. It is to be noted that, since the position of the movable accessory corresponds to the rotation amount of the DC motor 2 in a one-to-one manner, the control circuit 15 may determine whether or not the movable accessory has reached the position where the load changes by finding the rotation amount of the DC motor 2 by use of the number of times of detection signals received from the rotary encoder 4.

According to still another modified example, the drive control device 1 may control the DC motor 2 according to a method other than the PWM control, such as a pulse height modulation system.

The drive control device according to the above embodiment or modified example may be installed in a game machine such as a pinball game machine or a reel game machine.

Figure 10:
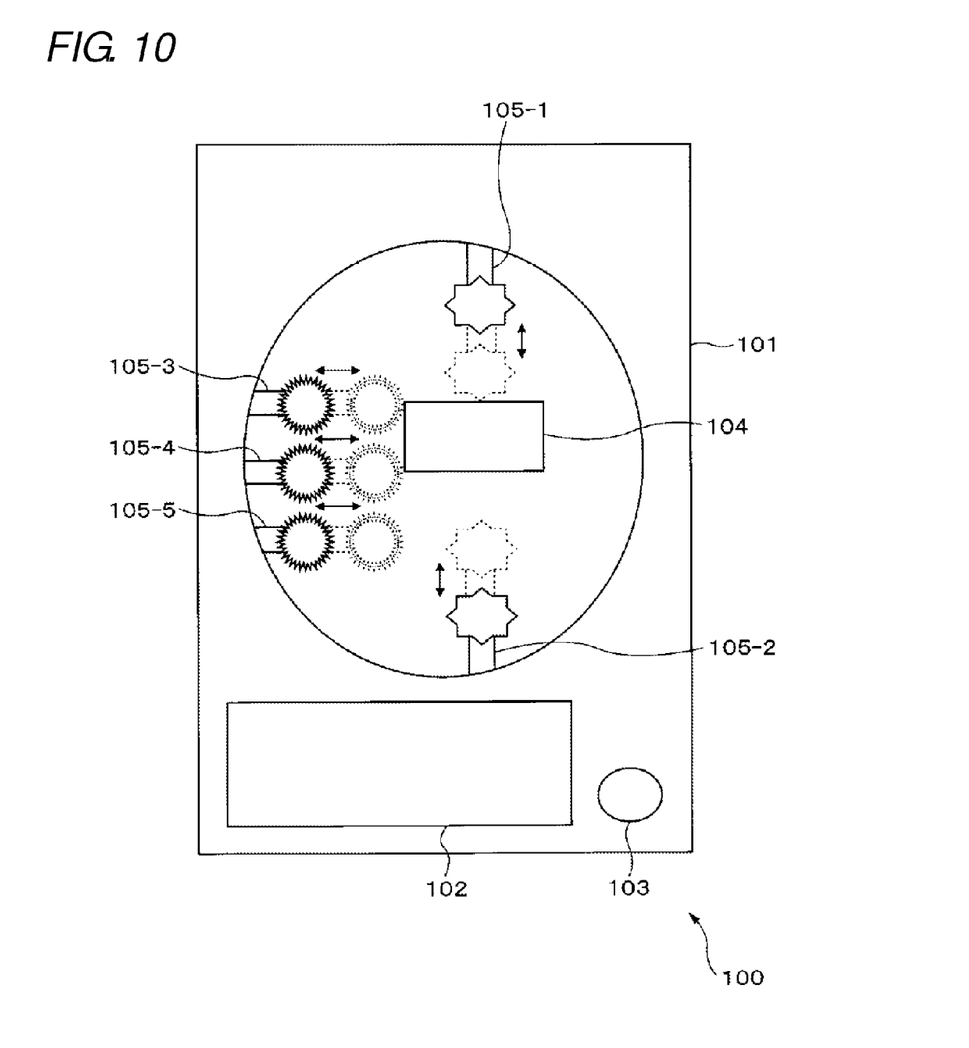
FIG. 10 is a schematic front view of a pinball game machine provided with a plurality of drive control devices according to the above embodiment or a modified example.
Figure 11:
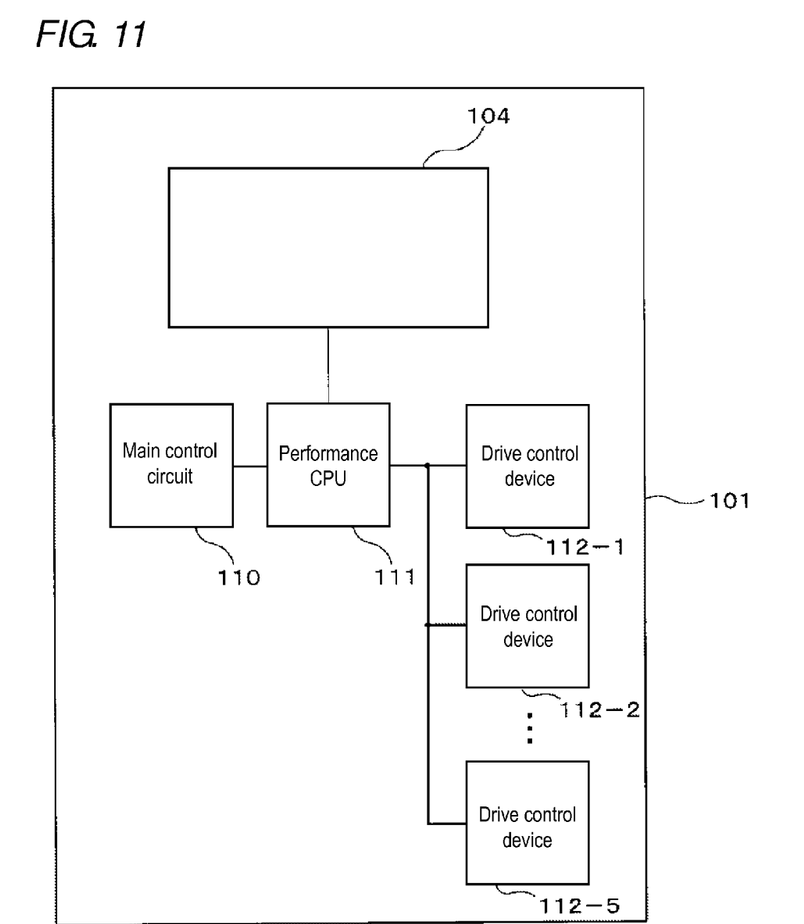
FIG. 11 is a schematic rear view of the pinball game machine shown in FIG. 10.

FIG. 10 is a schematic front view of a pinball game machine 100 provided with a plurality of drive control devices according to the above embodiment or modified example. Further, FIG. 11 is a schematic rear view of the pinball game machine 100. As shown in FIG. 10, the pinball game machine 100 has: a game board 101 as a game machine body, provided in most of a region from the top to the center; a ball receiving portion 102 arranged below game board 101; an operation unit 103 provided with a handle; and a display device 104 provided at the substantially center of game board 101.

Further, the pinball game machine 100 has five movable accessory portions 105-1 to 105-5 arranged on the front surface of the game board 101 for performance of a game. Further, a rail (not shown) is disposed on the side of the game board 101. Moreover, a large number of obstacle nails (not shown) and at least one winning device (not shown) are provided on the game board 101.

The operation unit 103 launches a game ball by predetermined force from a launch device (not shown) in accordance with a revolving amount of the handle operated by the player. The launched game ball moves upward along the rail, and is dropped among the large number of obstacle nails. When entry of the game ball into any of the winning devices is detected by a sensor, not shown, a main control circuit 110 provided on the rear surface of the game board 101 puts out a predetermined number of game balls in accordance with the winning devices where the game balls have entered, to the ball receiving portion 102 via a ball put-out device (not shown). Moreover, the main control circuit 110 displays a variety of images in the display device 104 via the performance CPU 111 provided on the rear surface of the game board 101.

Each of movable accessory portions 105-1 to 105-5 is one example of the movable bodies that move in accordance with a state of a game. They are driven by a DC motor and a drive device therefor (not shown) which are provided on the rear surface of game board 101 and controlled by drive control devices 112-1 to 112-5 according to the embodiment of the present invention or the modified example thereof. Each of the drive control devices 112-1 to 112-5, for example, creates a rotational speed table according to the flowchart shown in FIG. 7 at the start-up of the pinball game machine 100.

Based on a state signal indicating the state of the game transmitted from the main control circuit 110 to the performance CPU 111, the performance CPU 111 determines target coordinates and a target moving speed of each of the movable accessory portions 105-1 to 105-5, and creates a drive command according to that decision. Performance CPU 111 then outputs the generated drive command to each of the drive control devices 112-1 to 112-5. With reference to the rotational speed table, each of drive control devices 112-1 to 112-5 rotates the DC motor at a rotational speed included in the drive command, thereby to actuate the movable accessory portions 105-1 to 105-5.

In such a manner, the skilled person in the art can make a variety of changes in accordance with an embodiment within the range of the present invention.

What is claimed is:

1. A drive control device for a direct current motor which drives a movable body provided in a game machine, the drive control device being adapted for rotating the direct current motor in one of a first rotational direction and a second rotational direction at a time, the drive control device comprising:
   a storage circuit configured to store a reference rotational speed table indicating a relation between an amount of electric power per unit time which is supplied to the direct current motor and a reference value of a rotational speed of the direct current motor;
   a drive signal generation circuit configured to generate a drive signal in accordance with the electric power amount per unit time and output the drive signal to the direct current motor; and
   a control circuit configured to:
   calculate a first correction value that cancels a difference between a first rotational speed which is the reference value of the rotational speed of the direct current motor, and a second rotational speed which is an actual rotational speed at the time of making the drive signal generation circuit output a drive signal in accordance with a first electric power amount corresponding to the first rotational speed according to the reference rotational speed table and rotating the direct current motor in the first rotational direction,
   correct the reference value of the rotational speed which is stored in the reference rotational speed table based on the first correction value to create a first rotational speed table indicating a relation between an electric power amount per unit time and a rotational speed of the direct current motor concerning the first rotational direction,
   determine an electric power amount per unit time which corresponds to a first designated rotational speed according to the first rotational speed table upon designation to rotate the direct current motor in the first rotational direction, and
   notify the drive signal generation circuit of the determined electric power amount to generate a drive signal for rotating the direct current motor in the first rotational direction,
   wherein the control circuit is configured to:
   calculate a second correction value that cancels a difference between the first rotational speed and a third rotational speed which is an actual rotational speed at the time of making the drive signal generation circuit output a drive signal in accordance with the first electric power amount according to the reference rotational speed table, and rotate the direct current motor in the second rotational direction,
   wherein when an absolute value of a difference between the third rotational speed and the second rotational speed is equal to or larger than a predetermined threshold, the control circuit is further configured to:
   correct the reference value of the rotational speed which is stored in the reference rotational speed table based on the second correction value to create a second rotational speed table indicating a relation between an electric power amount per unit time and a rotational speed of the direct current motor concerning the second rotational direction,
   determine an electric power amount per unit time which corresponds to a second designated rotational speed according to the second rotational speed table upon designation to rotate the direct current motor in the second rotational direction, and
   notify the drive signal generation circuit of the determined electric power amount to generate a drive signal for rotating the direct current motor in the second rotational direction.

2. The drive control device according to claim 1, wherein, when the absolute value of the difference between the third rotational speed and the second rotational speed is smaller than the predetermined threshold,
   the control circuit is configured to:
   determine an electric power amount per unit time which corresponds to a designated rotational speed according to the first rotational speed table upon designation to rotate the direct current motor in the second rotational direction, and
   notify the drive signal generation circuit of the determined electric power amount to generate a drive signal for rotating the direct current motor in the second rotational direction.

3. A game machine comprising:
   a movable body;
   a direct current motor configured for driving the movable body; and
   a drive control device according to claim 2 for controlling the direct current motor.

4. The drive control device according to claim 1, wherein the control circuit is configured to perform steps of:
   (i) obtaining one of the first rotational speed table and the second rotational speed table based on a designated value of a rotational speed for rotating the direct current motor in one of the first rotational direction and the second rotational direction;
   (ii) determining a duty ratio corresponding to the designated value of the rotational speed;
   (iii) measuring an actual rotational speed of the direct current motor;

(iv) calculating a difference between a measured value of the actual rotational speed with the designated value of the rotational speed, wherein when the difference between the measured value and the designated value is within a predetermined error value of the rotational speed, the control circuit repeats steps (iii) to (iv).

5. The drive control device according to claim 4, wherein when the difference between the measured value and the designated value is larger than the predetermined error value and the measured value is larger than the designated value, the control circuit is configured to:

calculate a speed correction index; and correct the determined electric power amount based on the speed correction index to generate a drive signal for rotating the direct current motor in one of the first rotational direction and the second rotational direction according to the designated value of the rotational speed.

6. The drive control device according to claim 4, wherein when the difference between the measured value and the designated value is larger than the predetermined error value and the measured value is smaller than the designated value, the control circuit is configured to:

calculate a speed correction index; and correct the determined electric power amount based on the speed correction index to generate a drive signal for rotating the direct current motor in one of the first rotational direction and the second rotational direction according to the designated value of the rotational speed.

7. A game machine comprising:

a movable body;

a direct current motor configured for driving the movable body; and a drive control device according to claim 1 for controlling the direct current motor.

* * * * *